United States Patent
Woo et al.

(10) Patent No.: US 11,430,185 B2
(45) Date of Patent: Aug. 30, 2022

(54) METHOD AND APPARATUS FOR PROCESSING THREE-DIMENSIONAL DATA

(71) Applicant: Samsung Electronics Co., Ltd., Suwon-si (KR)

(72) Inventors: Jihwan Woo, Suwon-si (KR); Youngho Oh, Suwon-si (KR); Sungryeul Rhyu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/048,757

(22) PCT Filed: Apr. 22, 2019

(86) PCT No.: PCT/KR2019/004839
§ 371 (c)(1),
(2) Date: Oct. 19, 2020

(87) PCT Pub. No.: WO2019/203628
PCT Pub. Date: Oct. 24, 2019

(65) Prior Publication Data
US 2021/0158617 A1  May 27, 2021

(30) Foreign Application Priority Data
Apr. 20, 2018 (KR) .......................... 10-2018-0046311

(51) Int. Cl.
*G06T 7/90* (2017.01)
*G06T 9/00* (2006.01)
(Continued)

(52) U.S. Cl.
CPC .............. *G06T 19/00* (2013.01); *G06T 7/136* (2017.01); *G06T 7/50* (2017.01); *G06T 7/90* (2017.01);
(Continued)

(58) Field of Classification Search
CPC .... G06T 9/00; G06T 2207/10028; G06T 7/90
See application file for complete search history.

(56) References Cited

U.S. PATENT DOCUMENTS 8,290,305 B2  10/2012 Minear et al.
9,053,547 B2   6/2015 Kitamura et al.
(Continued)

FOREIGN PATENT DOCUMENTS

KR  10-2014-0043379 A   4/2014
KR  10-2015-0089364 A   8/2015
KR  10-2019-0121106 A  10/2019

OTHER PUBLICATIONS

3DG, PCC Test Model Category 2 V0, Xp 030023909, ISO/IEC JTC1/SC29/WG11 N17248, Dec. 14, 2017, Macau, China.
(Continued)

*Primary Examiner* — Matthew Salvucci
(74) *Attorney, Agent, or Firm* — Jefferson IP Law, LLP

(57) ABSTRACT

A method and an apparatus for compressing the three-dimensional data of a point cloud are disclosed. The present invention comprises, identifying a plurality of points constituting a point cloud, and projecting the plurality of identified points onto a projection plane so as to generate a projection image, wherein the bit number of projection points corresponding to the plurality of points projected in the projection image is determined on the basis of the distance between a first point closest to the projection plane and a second point farthest therefrom, on a normal with respect to the projection plane, among the plurality of points and/or on the basis of the number of intermediate points located between the first point and the second point.

12 Claims, 14 Drawing Sheets

(51) Int. Cl.
  *G06T 19/00* (2011.01)
  *G06T 7/136* (2017.01)
  *G06T 7/50* (2017.01)
(52) U.S. Cl.
  CPC ...... *G06T 9/00* (2013.01); *G06T 2207/10024* (2013.01); *G06T 2207/10028* (2013.01); *G06T 2219/008* (2013.01)

(56) References Cited

U.S. PATENT DOCUMENTS

| | | |
|---|---|---|
| 9,286,538 B1 | 3/2016 | Chen et al. |
| 9,787,321 B1 | 10/2017 | Hemmer et al. |
| 2012/0307010 A1 | 12/2012 | Evertt et al. |
| 2017/0094262 A1 | 3/2017 | Peterson et al. |
| 2019/0313110 A1* | 10/2019 | Mammou ............ H04N 19/597 |
| 2021/0112277 A1* | 4/2021 | Ricard ................. G06T 9/00 |

OTHER PUBLICATIONS

Samsung Electronics, [PCC] TMC2 Surface Separation for Video Encoding Efficiency, XP 030197155, ISO/IEC JTC1/SC29/WG11 MPEG2018/M43668, Jul. 13, 2018, Ljubljana, SI.

European Search Report dated Oct. 12, 2021, issued in European Application No. 19788875.3.

Kangying Cai (Technicolor) et al., Signal multiple points along one projection line in PCC TMC2 lossless mode, ISO/IEC JTC1/SC29/WG11 MPEG2018/m42652, XP030261653, Apr. 13, 2018, San Diego, CA.

European Search Report dated Jun. 1, 2021, issued in European Application No. 19788875.3.

Korean Office Action dated Mar. 25, 2022, issued in Korean Application No. 10-2018-0046311.

\* cited by examiner

| D1 VALUE | DEPTH VALUE PRESENT BETWEEN D0 AND D1 | NUMBER OF CASES | BITS NECESSARY FOR RECORDING |
|---|---|---|---|
| 0 | NONE | 0 | 0 |
| 1 | NONE | 0 | 0 |
| 2 | NONE, 1 | 2 | 1 |
| 3 | NONE, 1, 2, (1,2) | 4 | 2 |
| 4 | NONE, 1, 2, 3, (1,2), (1,3), (2,3), (1,2,3) | 8 | 3 |

FIG.6

| FIELD | SIZE |
|---|---|
| Most_significant_flag | 1b |
| If(Most_significant_flag==0) | |
| D1_value | 1b |
| Else | |
| D1_index | 2b |
| In_between_flag | 1b |
| If(In_between_flag == 0) | |
| pass | - |
| Else | |
| If(D1_index == 00) | |
| In_between_id | 0b |
| Else if(D1_index == 1) | |
| In_between_id | 2b |
| Else if(d1_index == 2) | |
| In_between_id | 3b |
| Else if(d1_index == 3) | |
| In_between_id | 4b |

FIG.7

| No. | D0 | D1 DISTRIBUTION | | | | REMARKS | STATISTICAL VALUES |
|---|---|---|---|---|---|---|---|
| 1 | 0 | | | | | D1=0 | 0.58900 |
| 2 | 0 | 1 | | | | D1=1 | 0.37900 |
| 3 | 0 | | 2 | | | D1=2 | 0.02000 |
| 4 | 0 | 1 | 2 | | | ONE IN-BETWEEN POINT | 0.00200 |
| 5 | 0 | | | 3 | | D1=3 | 0.00250 |
| 6 | 0 | 1 | | 3 | | ONE IN-BETWEEN POINT | 0.00100 |
| 7 | 0 | | 2 | 3 | | ONE IN-BETWEEN POINT | 0.00100 |
| 8 | 0 | 1 | 2 | 3 | | TWO IN-BETWEEN POINTS | 0.00050 |
| 9 | 0 | | | | 4 | D1=4 | 0.00200 |
| 10 | 0 | 1 | | | 4 | ONE IN-BETWEEN POINT | 0.00050 |
| 11 | 0 | | 2 | | 4 | ONE IN-BETWEEN POINT | 0.00050 |
| 12 | 0 | | | 3 | 4 | ONE IN-BETWEEN POINT | 0.00050 |
| 13 | 0 | 1 | 2 | | 4 | TWO IN-BETWEEN POINTS | 0.00050 |
| 14 | 0 | | 2 | 3 | 4 | TWO IN-BETWEEN POINTS | 0.00050 |
| 15 | 0 | 1 | | 3 | 4 | TWO IN-BETWEEN POINTS | 0.00025 |
| 16 | 0 | 1 | 2 | 3 | 4 | THREE IN-BETWEEN POINTS | 0.00025 |

FIG.8

| PROBABILITY | D1 VALUE | D1 VALUE BIT | ADDITIONAL BITS | TOTAL BITS | NUMBER OF BITS REQUIRED |
|---|---|---|---|---|---|
| 0.58900 | 0 | 3 | 0 | 3 | 1.767 |
| 0.37900 | 1 | 3 | 0 | 3 | 1.137 |
| 0.02200 | 2 | 3 | 1 | 4 | 0.088 |
| 0.00500 | 3 | 3 | 2 | 5 | 0.025 |
| 0.00500 | 4 | 3 | 3 | 6 | 0.03 |
| TOTAL | | | | | 3.047 |

FIG.9

| No. | | D1 DISTRIBUTION STATISTICAL VALUE | NUMBER OF BITS REQUIRED | BIT CODE | | | | | | | | | NUMBER OF BITS REPRESENTED |
|---|---|---|---|---|---|---|---|---|---|---|---|---|---|
| 1 | D0_0 | 0.589 | 1 | 0 | | | | | | | | | 0.59 |
| 2 | D1_0 | 0.379 | 2 | 1 | 0 | | | | | | | | 0.76 |
| 3 | D2_0 | 0.020 | 3 | 1 | 1 | 0 | | | | | | | 0.06 |
| 4 | D3_0 | 0.003 | 5 | 1 | 1 | 1 | 0 | 0 | | | | | 0.01 |
| 5 | D4_0 | 0.002 | 6 | 1 | 1 | 1 | 0 | 0 | 0 | | | | 0.01 |
| 6 | D2_1 | 0.002 | 6 | 1 | 1 | 1 | 0 | 0 | 1 | | | | 0.01 |
| 7 | D3_1 | 0.001 | 7 | 1 | 1 | 1 | 1 | 1 | 0 | 0 | | | 0.01 |
| 8 | D3_2 | 0.001 | 7 | 1 | 1 | 1 | 1 | 1 | 0 | 1 | | | 0.01 |
| 9 | D3_3 | 0.001 | 9 | 1 | 1 | 1 | 1 | 1 | 1 | 0 | 0 | 0 | 0.00 |
| 10 | D4_1 | 0.001 | 9 | 1 | 1 | 1 | 1 | 1 | 1 | 0 | 0 | 1 | 0.00 |
| 11 | D4_2 | 0.001 | 9 | 1 | 1 | 1 | 1 | 1 | 1 | 0 | 1 | 0 | 0.00 |
| 12 | D4_3 | 0.001 | 9 | 1 | 1 | 1 | 1 | 1 | 1 | 0 | 1 | 1 | 0.00 |
| 13 | D4_4 | 0.001 | 9 | 1 | 1 | 1 | 1 | 1 | 1 | 1 | 0 | 0 | 0.00 |
| 14 | D4_5 | 0.001 | 9 | 1 | 1 | 1 | 1 | 1 | 1 | 1 | 0 | 1 | 0.00 |
| 15 | D4_6 | 0.000 | 9 | 1 | 1 | 1 | 1 | 1 | 1 | 1 | 1 | 0 | 0.00 |
| 16 | D4_7 | 0.000 | 9 | 1 | 1 | 1 | 1 | 1 | 1 | 1 | 1 | 1 | 0.00 |
| | | | TOTAL BITS | | | | | | | | | | 1.49 |

FIG.10

| FIELD | DESCRIPTION |
|---|---|
| for (j=0; j<height; j++) | height: HEIGHT OF T0 AND T1 DATA MATRIX |
| for (i=0; i<width; i++) | width: WIDTH OF T0 AND T1 DATA MATRIX |
| while(1) | |
| if(Diff(i, j, radius)>Color_Threshold) | Diff: FUNCTION OF COMPARING T0[J][I] AND T1[J][I] (POSITION I, IN HORIZONTAL DIRECTION, AND J, IN VERTICAL DIRECTION) AND T0 AND T1 IN SURROUNDING AREA WITHIN RADIUS AND RETURNING THE DIFFERENCE<br>Color_Threshold: THRESHOLD FOR EVALUATING COLOR DIFFERENCE |
| surfaceThickness = surfaceThickness-1 | |
| D1 update(surfaceThickness) | RECALCULATES AND RETURNS D1 USING NEW SURFACE THICKNESS |
| T0 update(surfaceThickness) | RECALCULATES AND RETURNS T0 USING NEW SURFACE THICKNESS |
| Else | |
| break; | |

FIG.12

METHOD AND APPARATUS FOR PROCESSING THREE-DIMENSIONAL DATA

CROSS-REFERENCE TO RELATED APPLICATION(S)

This application is a U.S. National Stage application under 35 U.S.C. § 371 of an International application number PCT/KR2019/004839, filed on Apr. 22, 2019, which is based on and claims priority of priority of a Korean patent application number 10-2018-0046311, filed on Apr. 20, 2018, in the Korean Intellectual Property Office, the disclosure of which is incorporated by reference herein in its entirety.

BACKGROUND

1. Field

The technical idea of the disclosure concerns devices and methods for operating the same, and more specifically, to devices for processing three-dimensional data and methods for operating the same.

2. Description of the Related Art

A point cloud which is a representation of 3D data means a set of a vast amount of points, and high-volume 3D data may be represented as a point cloud. As a value compared with a 2D image, a point cloud is a method for representing one point in three dimension and is in the form of a vector which may include both position coordinates and colors. For example, a point cloud may be represented as (x, y, z, R, G, B). A point cloud which forms a spatial configuration with myriad colors and position data turns into specific data as the density increases and thus happens to have a meaning as one 3D model.

The point cloud takes up significant memory resources. Thus, efficient transmission of a point cloud requires that the point cloud be compressed into a smaller capacity. Therefore, a need exists for a method for processing into a smaller capacity during the course of transforming 3D data for the point cloud into 2D data.

SUMMARY

The technical idea of the disclosure relates to devices and methods for processing three-dimensional data, and there are provided devices and methods for transforming point clouds.

To achieve the foregoing objectives, according to an embodiment of the technical idea of the disclosure, a method for processing three-dimensional data for a point cloud comprises identifying a plurality of points constituting the point cloud and generating a projection image by projecting the plurality of identified points to a projection plane, wherein a number of bits representing a projection point corresponding to at least one point among the plurality of points projected to the projection image is determined based on at least one of a distance between a first point and a second point among the plurality of points and a number of in-between points positioned between the first point and the second point, wherein the first point is a point closest to the projection plane among at least one point on a normal line to the projection plane, and wherein the second point is a point farthest from the projection plane within a threshold distance from the first point among the at least one point on the normal line.

According to another embodiment of the technical idea of the disclosure, a device for processing three-dimensional data for a point cloud comprises a processor and a memory configured to store instructions executable by the processor, wherein the processor is configured to identify a plurality of points constituting the point cloud and generate a projection image by projecting the plurality of identified points to a projection plane, wherein a number of bits representing a projection point corresponding to at least one point among the plurality of points projected to the projection image is determined based on at least one of a distance between a first point and a second point among the plurality of points and a number of in-between points positioned between the first point and the second point, wherein the first point is a point closest to the projection plane among at least one point on a normal line to the projection plane, and wherein the second point is a point farthest from the projection plane within a threshold distance from the first point among the at least one point on the normal line.

According to another embodiment of the technical idea of the disclosure, a method for processing three-dimensional data for a point cloud comprises extracting color information corresponding to a first point included in a region of interest, extracting color information corresponding to a second point positioned within a threshold distance from the first point, comparing a threshold with a difference between the color information corresponding to the first point and the color information corresponding to the second point, and if the difference is equal to or smaller than the threshold, determining that the second point is included in the region of interest.

According to another embodiment of the technical idea of the disclosure, a device for processing three-dimensional data for a point cloud comprises a processor and a memory configured to store instructions executable by the processor, wherein the processor is configured to extract color information corresponding to a first point included in a region of interest, extract color information corresponding to a second point positioned within a threshold distance from the first point, compare a threshold with a difference between the color information corresponding to the first point and the color information corresponding to the second point, and if the difference is equal to or smaller than the threshold, determine that the second point is included in the region of interest.

According to the disclosure, there may be provided devices and methods capable of processing three-dimensional data for point clouds. There may be provided devices and methods capable of processing three-dimensional data into a smaller capacity by variably determining the number of bits representing three-dimensional data depending on relative positions between points.

BRIEF DESCRIPTION OF THE DRAWINGS

FIG. 6 is a table for describing an example of variably allocating the number of bits according to an example embodiment of the disclosure;

FIG. 7 is a table illustrating commands executable by a processor according to an example embodiment of the disclosure;

FIG. 8 is a table illustrating distribution probabilities of three-dimensional data constituting a point cloud according to an example embodiment of the disclosure;

FIG. 9 is a table illustrating the number of bits necessary in the example of variably allocating the number of bits according to an example embodiment of the disclosure;

FIG. 10 is a table illustrating the number of bits necessary in the example of variably allocating the number of bits according to an example embodiment of the disclosure;

FIG. 12 is a table illustrating commands executable by a processor and descriptions thereof, according to an example embodiment of the disclosure;

DETAILED DESCRIPTION

Hereinafter, embodiments of the present invention are described in detail with reference to the accompanying drawings. The embodiments described herein are provided merely for illustration purposes but should not be interpreted as limiting the scope of the disclosure. Any other embodiments that one of ordinary skill in the art would readily infer or elicit from the embodiments set forth herein should also be interpreted as belonging to the scope of the disclosure.

When an element "includes" another element, the element may further include the other element, rather excluding the other element, unless particularly stated otherwise. Further, the terms "unit," "module," or "part" as used herein denote a unit processing at least one function or operation, and a unit, module, or part may be implemented in hardware, software, or a combination thereof.

Throughout the specification, "minimum unit" means a minimum unit designated to differentiating depth value steps between a plurality of points constituting a point cloud.

Throughout the specification, "threshold distance" and "threshold unit" mean any pre-defined distance.

Throughout the specification, "region of interest" means any pre-defined area.

Throughout the specification, "threshold" means any pre-defined value.

Figure 1:
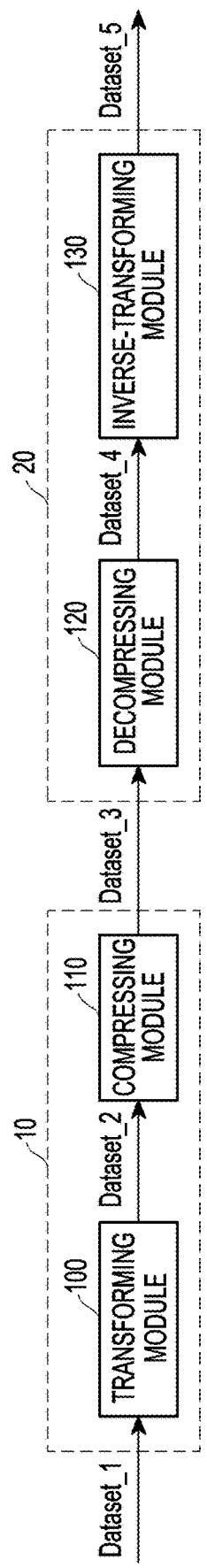
FIG. 1 illustrates an overall system for transmitting and receiving a point cloud according to an example embodiment of the disclosure.

FIG. 1 illustrates an overall system for transmitting and receiving a point cloud according to an embodiment of the disclosure.

Referring to FIG. 1, a transmitter 10 may include a transforming module 100 and a compressing module 110, and a receiver 20 may include a decompressing module 120 and an inverse-transforming module 130.

The transforming module 100 may transform Dataset_1 into Dataset_2 which is a type of data processable by the compressing module 110. For example, Dataset_1 may be three-dimensional data, and Dataset_2 may be two-dimensional data. The compressing module 110 may compress Dataset_2, thereby generating Dataset_3. As an example, the size of Dataset_3 may be smaller than the size of Dataset_2.

The decompressing module 120 may retransform Dataset_3 into Dataset_4 which has the same data type as Dataset_2. The inverse-transforming module 130 may retransform Dataset_4 into Dataset_5 which has the same data type as Dataset_1.

As a non-limiting example, the compressing module 110 may include a high efficiency video codec (HEVC) encoder or an entropy encoder, and the decompressing module 120 may include an HEVC decoder or an entropy decoder.

Figure 2:
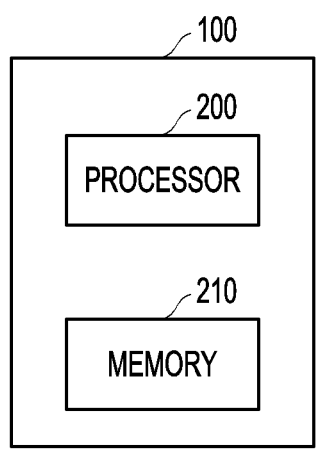
FIG. 2 is a block diagram illustrating a device according to an example embodiment of the disclosure.

FIG. 2 is a block diagram illustrating a device according to an embodiment of the disclosure.

Referring to FIG. 2, the transforming module 100 may include a processor 200 and a memory 210. The processor 200 may identify a plurality of points constituting a point cloud which is three-dimensional data input to the transforming module 100. For example, the processor 200 may generate a projection image by projecting the plurality of points constituting the point cloud to a projection plane in order to transform the three-dimensional data input to the transforming module 100 into two-dimensional data. In an example embodiment, the projection plane may be any cross section passing through the point cloud which is three-dimensional data input to the transforming module 100.

The memory 210 may include computer-readable and/or computer-executable software code including a plurality of instructions. In an example embodiment, the memory 210 may store a plurality of signal processing algorithms for signal processing of wireless communication. The plurality of signal processing algorithms stored in the memory 210 may be executed as various function blocks provided in a modem. For example, at least two or more of the signal processing algorithms stored in the memory 210 may have different complexities.

The memory 210 may include a volatile memory device, e.g., dynamic random access memory (DRAM) or synchronous dynamic random access memory (SDRAM). Further, the memory 210 may include a non-volatile memory device, e.g., electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), or ferroelectric random access memory (FRAM).

In the disclosure, the complexity of algorithm may be varied based on, e.g., computational amount, number of clocks, number of logic blocks, number of adders, number of times of repetitive processing in the algorithm, number of samples of the result, and degree of prior information. For example, as the computational amount of the algorithm increases, the complexity increases, and as the number of logic blocks for performing the algorithm decreases, the complexity may decrease. In an example embodiment, the complexity of the signal processing algorithm may increase as the signal processing level rises.

Figure 3:
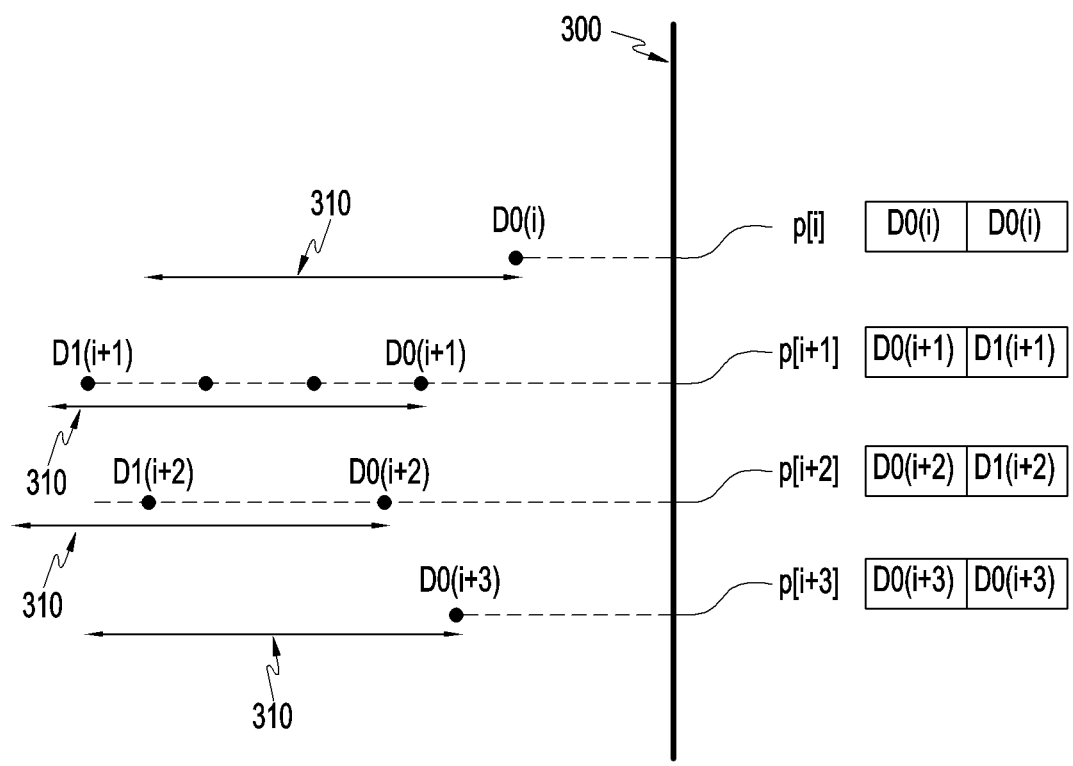
FIG. 3 illustrates an example in which a device transforms three-dimensional data for a point cloud into two-dimensional data according to an example embodiment of the disclosure.

FIG. 3 illustrates an example in which a device transforms three-dimensional data for a point cloud into two-dimensional data according to an example embodiment of the disclosure.

The processor 200 of FIG. 2 may identify a plurality of points (e.g., D0(i), D0(i+1), D1(i+1), D0(i+2), D1(i+2), or D0(i+3)) constituting a point cloud which is three-dimensional data input to the transforming module 100 of FIG. 2.

The processor 200 may generate a projection image by projecting a plurality of points to a projection plane 300 which is any cross section passing through the point cloud.

The processor 200 may generate position information (p[i], p[i+1], p[i+2], and p[i+3]) about the plurality of points projected to the projection plane 300. For example, the plurality of points on the same normal line to the projection plane 300 may have the same position information.

The processor 200 may designate points closest to the projection plane 300, among the plurality of points constituting the point cloud, as first points (D0(i), D0(i+1), D0(i+2), D0(i+3)).

The processor 200 may designate the point farthest from the projection plane 300, within a threshold distance 310 from the first point among the plurality of points placed on the same normal line as the first point (D0(i), D0(i+1), D0(i+2), D0(i+3)) as the second point (D1(i+1), D1(i+2)). In an example embodiment, if the plurality of points constituting the point cloud are not within the threshold distance 310 from the first point on the same normal line as the first point (D0(i), D0(i+3)), the processor 200 may designate the second point as being equal to the first point (D0(i), D0(i+3)).

In an example embodiment, the processor 200 may allocate the bit count, which indicates the projection points included in the projection image projected to the projection plane 300, as two bits. For example, the processor 200 may store information about the first point (D0(i), D0(i+1), D0(i+2), D0(i+3)) in one of the two bits and store information about the second point (D0(i), D1(i+1). D1(i+2), D0(i+3)) in the other bit. In an example embodiment, the information about the first point and the second point may be information indicating the relative positions of the first point and the second point for the projection plane 300 or information about the distances between the projection plane 300 and the first point and the second point.

In an example embodiment, the transforming module 100 of FIG. 2 may output two-dimensional data, which represents the projection point, as two bits including the information about the first point and the second point.

Figure 4:
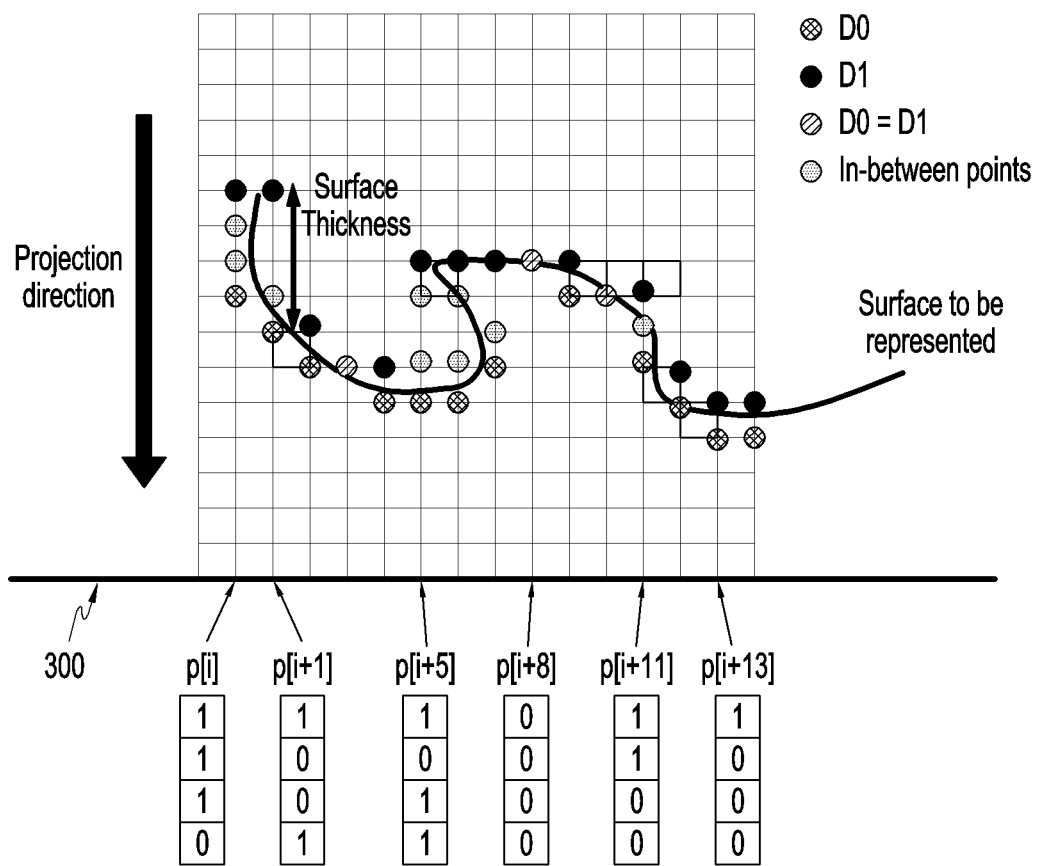
FIG. 4 illustrates an example in which a device fixedly allocates the number of bits representing three-dimensional data during the course of transforming three-dimensional data for a point cloud into two-dimensional data according to an example embodiment of the disclosure.

FIG. 4 illustrates an example in which a device fixedly allocates the number of bits representing three-dimensional data during the course of transforming three-dimensional data for a point cloud into two-dimensional data according to an example embodiment of the disclosure.

The processor 200 of FIG. 2 may identify a plurality of points constituting a point cloud which is three-dimensional data input to the transforming module 100 of FIG. 2.

The processor 200 may generate a projection image by projecting a plurality of points to a projection plane 300 which is any cross section passing through the point cloud.

The processor 200 may generate position information (p[i], p[i+1], p[i+5], p[i+8], p[i+11], p[i+13]) about the plurality of points projected to the projection plane 300. For example, the plurality of points on the same normal line to the projection plane 300 may have the same position information.

The processor 200 may designate points closest to the projection plane 300, among the plurality of points constituting the point cloud, as first points (D0).

In an example embodiment, the transmitter 10 of FIG. 1 may transmit the first point D0 and the second point D1 to the receiver 20 via different layers.

The processor 200 may designate the point farthest from the projection plane 300, within a threshold distance (surface thickness) from the first point among the plurality of points placed on the same normal line as the first point (D0) as the second point (D1). In an example embodiment, the threshold distance (surface thickness) may be 5. In an example embodiment, if the plurality of points constituting the point cloud are not within the threshold distance (surface thickness) from the first point on the same normal line as the first point (D0), the second point (D0=D1) may be designated as being equal to the first point.

The processor 200 may identify in-between points passing through the same normal line as the first point (D0) and the second point (D1) between the first point (D0) and the second point (D1) on the same normal line. In an example embodiment, the processor 200 may identify the positions of the in-between points relative to the first point and the second point.

In an example embodiment, the processor 200 may determine that the bit count indicating the projection points included in the projection image projected to the projection plane 300 is a value one smaller than the threshold distance (surface thickness). For example, if the threshold distance (surface thickness) is 5, the processor 200 may allocate the bit count, which indicates the projection points, as four bits. In an example embodiment, the processor 200 may store information about the in-between points in three of the four bits and information about the second point (D1) in the remaining one bit.

Referring to FIG. 4, the processor 200 may indicate the presence or absence of an in-between point and second point in the bit indicating, e.g., the projection point, as 1 or 0. In an example embodiment, if the threshold distance (surface thickness) is 5, the processor 200 may allocate the bit count indicating the projection points as four bits. Each bit may mean a point located relatively farther from the first point (D0) in order from the front. For example, among the four allocated bits, the first bit may indicate the presence or absence of a projection point at a point where the distance from the first point (D0) is 1, the second bit may indicate the presence or absence of a projection point at a point where the distance from the first point (D0) is 2, the third bit may indicate the presence or absence of a projection point at a point where the distance from the first point (D0) is 3, and the fourth bit may indicate the presence or absence of a projection point at a point where the distance from the first point (D0) is 4.

Referring to FIG. 4, in an example embodiment, in the projection position p[i] to the projection plane 300, two in-between points and one second point (D1) are positioned consecutively from the first point D0. Based thereupon, the processor 200 may allocate 1's, which mean that in-between points are present at the points where the distances from the first point (D0) are 1 and 2, to the first bit and the second bit among the four allocated bits. Further, the processor 200 may allocate 1, which means that the second point (D1) is present at the point where the distance from the first point D0 is 3, to the third bit among the four allocated bits. Further, the processor 200 may allocate 0, which means that no 3D point is present at the point where the distance from the first point (D0) is 4, to the fourth bit among the four allocated bits.

Referring to FIG. 4, in an example embodiment, in the projection position p[i+8] to the projection plane 300, the first point (D0) is the same as the second point (D1). Based thereupon, the processor 200 may allocate 0's, which mean that no 3D point is present at the points where the distances from the first point (D0) are 1, 2, 3, and 4, to the first, second, third, and fourth bits among the four allocated bits.

Referring to FIG. 4, in an example embodiment, in the projection position p[i+13] to the projection plane 300, the second point (D1) is positioned consecutively from the first point (D0). Based thereupon, the processor 200 may allocate 1, which means that the second point (D1) is present at the point where the distance from the first point (D0) is 1, to the first bit among the four allocated bits. Further, the processor 200 may allocate 0's, which mean that no 3D point is present at the points where the distances from the first point (D0) are 2, 3, and 4, to the second, third, and fourth bits among the four allocated bits.

Figure 5A:
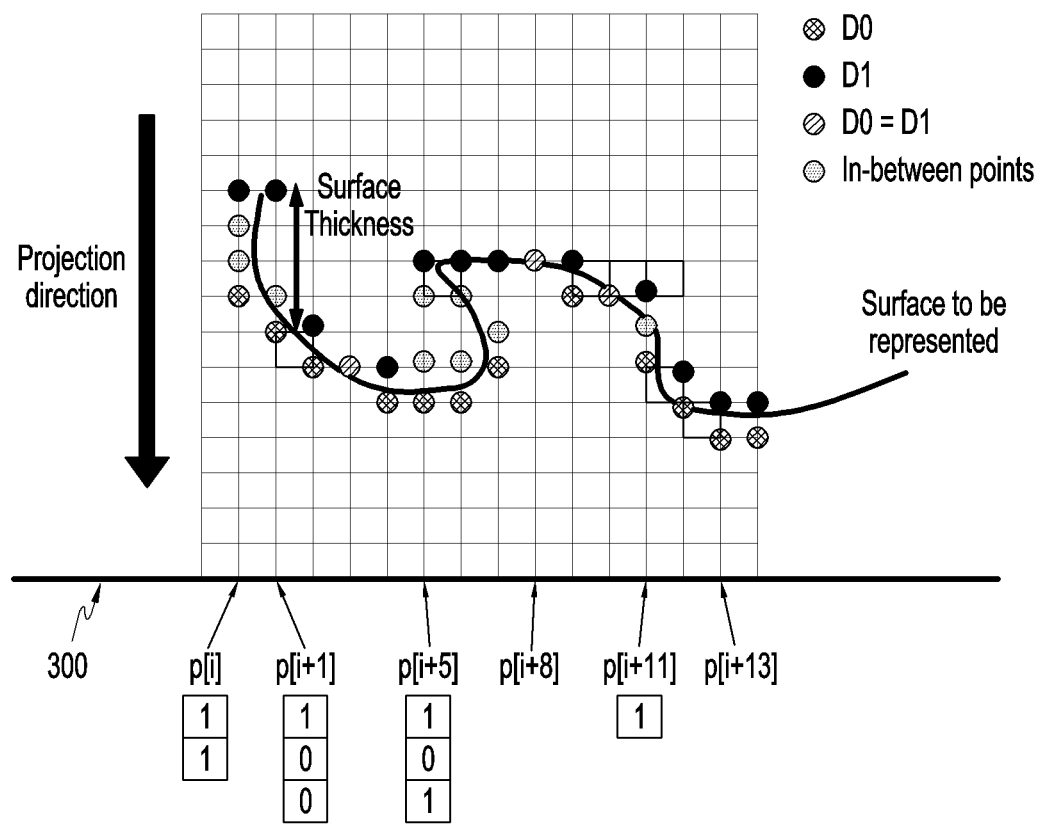
FIG. 5A illustrates an example in which a device variably allocates the number of bits representing three-dimensional data during the course of transforming three-dimensional data for a point cloud into two-dimensional data according to an example embodiment of the disclosure.

FIG. 5A illustrates an example in which a device variably allocates the number of bits representing three-dimensional data during the course of transforming three-dimensional data for a point cloud into two-dimensional data according to an example embodiment of the disclosure.

The processor 200 of FIG. 2 may identify a plurality of points constituting a point cloud which is three-dimensional data input to the transforming module 100 of FIG. 2.

The processor 200 may generate a projection image by projecting a plurality of points to a projection plane 300 which is any cross section passing through the point cloud.

The processor 200 may generate position information (p[i], p[i+1], p[i+5], p[i+8], p[i+11], p[i+13]) about the plurality of points projected to the projection plane 300. For example, the plurality of points on the same normal line to the projection plane 300 may have the same position information.

The processor 200 may designate points closest to the projection plane 300, among the plurality of points constituting the point cloud, as first points (D0).

The processor 200 may designate the point farthest from the projection plane 300, within a threshold distance (surface thickness) from the first point among the plurality of points placed on the same normal line as the first point (D0) as the second point (D1). In an example embodiment, the threshold distance (surface thickness) may be 5. In an example embodiment, if the plurality of points constituting the point cloud are not within the threshold distance (surface thickness) from the first point on the same normal line as the first point (D0), the second point (D0=D1) may be designated as being equal to the first point.

The processor 200 may determine the bit count indicating the second point (D1) according to the distance between the first point (D0) and the second point (D1). In an example embodiment, if the second point is the same as the first point (D0=D1), the processor 200 may determine that the bit count indicating the second point (D1) is 1. For example, since the second point (D1) whose projection position to the projection plane 300 is p[i+8] is the same as the first point (D0), the processor 200 may determine that the bit count indicating the second point (D1) is 1 based thereupon, and store 0 as the bit value indicating the second point (D0=D1).

In an example embodiment, if the first point (D0) and the second point (D1) are apart from each other by a minimum unit, the processor 200 may determine that the bit count indicating the second point (D1) is 1. In an example embodiment, the minimum unit is a minimum unit designated to differentiating depth value steps between the plurality of points constituting the point cloud. For example, since the second point (D1) whose projection position to the projection plane 300 is p[i+13] is positioned consecutively from the first point (D0), the processor 200 may determine that the bit count indicating the second point (D1) is 1 based thereupon, and store 1 as the bit value indicating the second point (D1).

In an example embodiment, if the first point (D0) and the second point (D1) are apart from each other by n times the minimum unit (where n is an integer and n>1), the processor 200 may determine that the bit count indicating the second point (D1) is the minimum value necessary to store the binary number of n. For example, since the second point (D1) whose projection position to the projection plane 300 is p[i] is apart from the first point (D0) by three times the minimum unit, the processor 200 may determine that the bit count indicating the second point (D1) is the minimum value, i.e., 2, necessary to store $11_{(2)}$, which is the binary number of 3, based thereupon, and store 11 as the bit values indicating the second point (D1). For example, since the second point D1 whose projection position to the projection plane 300 is p[i+11] is apart from the first point (D0) by two times the minimum unit, the processor 200 may determine that the bit count indicating the second point (D1) is the minimum value, i.e., 2, necessary to store $10_{(2)}$, which is the binary number of 2, based thereupon, and store 10 as the bit values indicating the second point (D1).

The processor 200 may identify in-between points passing through the same normal line as the first point (D0) and the second point (D1) between the first point (D0) and the second point (D1) on the same normal line. In an example embodiment, the processor 200 may identify the positions of the in-between points relative to the first point and the second point.

The processor 200 may determine the bit count, which indicates the projection point included in the projection image projected to the projection plane 300, based on at least one of the distance between the first point (D0) and the second point (D1) and the number of in-between points positioned between the first point (D0) and the second point (D1). For example, the projection point may be a set of in-between points on the same normal line.

If the second point is the same as the first point (D0=D1), the processor 200 may determine that the bit count indicating the projection point is 0. Referring to FIG. 5A, in an example embodiment, since the second point whose projection position to the projection plane 300 is p[i+8] is the same as the first point (D0=D1), the processor 200 may determine that the bit count indicating the projection point is 0 based thereupon.

If the first point (D0) and the second point (D1) are apart from each other by the minimum unit, the processor 200 may determine that the bit count indicating the projection point is 0. Referring to FIG. 5A, in an example embodiment, since the second point (D1) whose projection position to the projection plane 300 is p[i+13] is positioned consecutively from the first point (D0), the processor 200 may determine that the bit count indicating the second point (D1) is 0 based thereupon.

If the first point (D0) and the second point (D1) are apart from each other by n times the minimum unit (where n is an integer and n>1), the processor 200 may determine that the bit count indicating the projection point is n−1. Further, the processor 200 may indicate the presence or absence of an in-between point in the bit indicating the projection point, as 1 or 0. For example, if a plurality of bits are allocated, each bit may mean a point relatively farther away from the first point (D0) in order from the front.

Referring to FIG. 5A, in an example embodiment, since the second point (D1) whose projection position to the projection plane 300 is p[i] is positioned apart from the first point (D0) by three times the minimum unit, the processor 200 may determine that the bit count indicating the projection point is 2 based thereupon. Further, the processor 200 may allocate 1, which means that a 3D point is present at the point where the distance from the first point (D0) is 1, to the first bit of the two allocated bits. Further, the processor 200 may allocate 1, which means that a 3D point is present at the point where the distance from the first point (D0) is 2, to the second bit of the two allocated bits.

Referring to FIG. 5A, in an example embodiment, since the second point (D1) whose projection position to the projection plane 300 is p[i+5] is positioned apart from the first point (D0) by four times the minimum unit, the processor 200 may determine that the bit count indicating the projection point is 3 based thereupon. Further, the processor 200 may allocate 1, which means that a 3D point is present at the point where the distance from the first point (D0) is 1, to the first bit of the three allocated bits. Further, the processor 200 may allocate 0, which means that no 3D point is present at the point where the distance from the first point D0 is 2, to the second bit of the three allocated bits. Further, the processor 200 may allocate 1, which means that a 3D point is present at the point where the distance from the first point (D0) is 3, to the third bit of the three allocated bits.

Figure 5B:
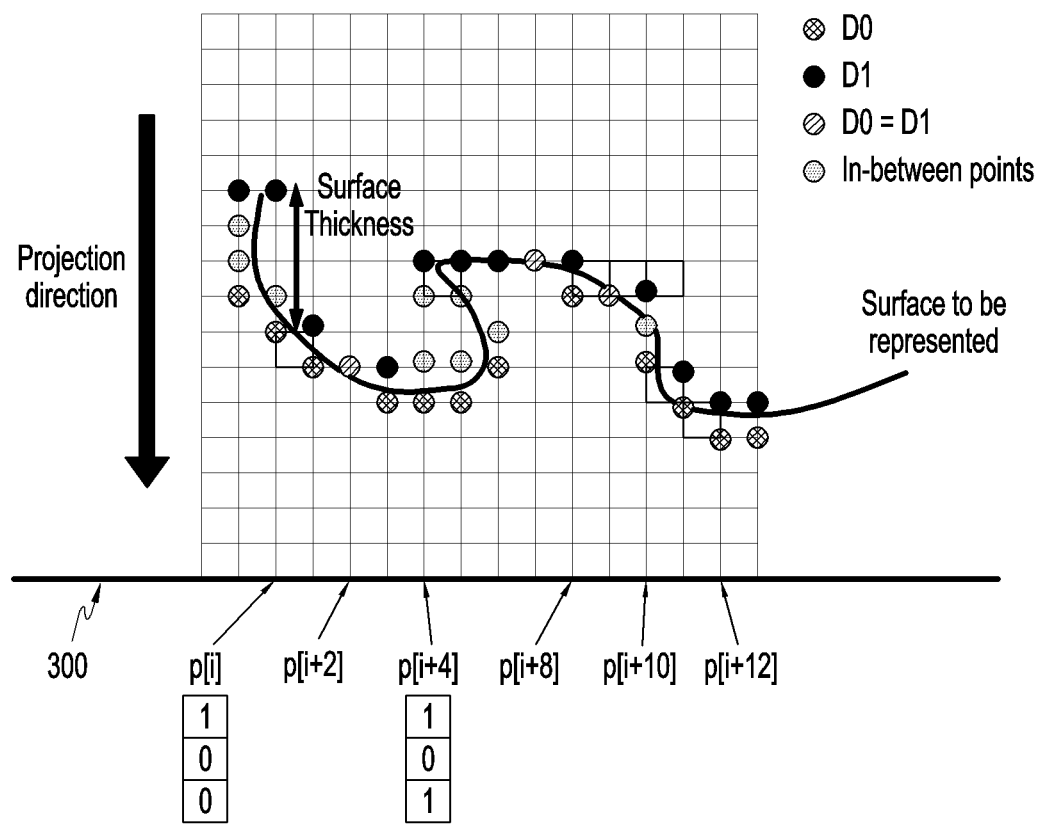
FIG. 5B illustrates an example in which a device variably allocates the number of bits representing three-dimensional data during the course of transforming three-dimensional data for a point cloud into two-dimensional data according to an example embodiment of the disclosure.

FIG. 5B illustrates an example in which a device variably allocates the number of bits representing three-dimensional data during the course of transforming three-dimensional data for a point cloud into two-dimensional data according to an example embodiment of the disclosure. In connection with FIG. 5B, no duplicate description is given of the embodiment described above in connection with FIG. 5A.

The processor 200 of FIG. 2 may identify a plurality of points constituting a point cloud which is three-dimensional data input to the transforming module 100 of FIG. 2.

The processor 200 may generate a projection image by projecting a plurality of points to a projection plane 300 which is any cross section passing through the point cloud.

The processor 200 may generate position information (p[i], p[i+2], p[i+4], p[i+8], p[i+10], p[i+12]) about the plurality of points projected to the projection plane 300.

The processor 200 may designate points closest to the projection plane 300, among the plurality of points constituting the point cloud, as first points (D0).

The processor 200 may designate the point farthest from the projection plane 300, within a threshold distance (surface thickness) from the first point among the plurality of points placed on the same normal line as the first point (D0), as the second point (D1).

The processor 200 may determine the bit count indicating the second point (D1) according to the distance between the first point (D0) and the second point (D1). In an example embodiment, if the second point is the same as the first point (D0=D1), the processor 200 may determine that the bit count indicating the second point (D1) is 1. In an example embodiment, if the first point (D0) and the second point (D1) are apart from each other by a minimum unit, the processor 200 may determine that the bit count indicating the second point (D1) is 1. In an example embodiment, if the first point (D0) and the second point (D1) are apart from each other by n times the minimum unit (where n is an integer and n>1), the processor 200 may determine that the bit count indicating the second point (D1) is the minimum value necessary to store the binary number of n.

The processor 200 may identify in-between points passing through the same normal line as the first point (D0) and the second point (D1) between the first point (D0) and the second point (D1) on the same normal line. In an example embodiment, the processor 200 may identify the positions of the in-between points relative to the first point and the second point.

The processor 200 may determine the bit count, which indicates the projection point included in the projection image projected to the projection plane 300, based on at least one of the distance between the first point (D0) and the second point (D1) and the number of in-between points positioned between the first point (D0) and the second point (D1). For example, the projection point may be a set of in-between points on the same normal line.

If the second point is the same as the first point (D0=D1) (p[i+2]), the processor 200 may determine that the bit count indicating the projection point is 0.

If the first point (D0) and the second point (D1) are apart from each other by the minimum unit (p[i+8], p[i+12]), the processor 200 may determine that the bit count indicating the projection point is 0.

If the first point (D0) and the second point (D1) are apart from each other by two times the minimum unit, and there is an in-between point, the processor 200 may determine that the bit count indicating the projection point is 0. Referring to FIG. 5B, in an example embodiment, since the second point (D1) whose projection position to the projection plane 300 is p[i+10] is positioned apart from the first point (D0) by two times the minimum unit, and there is one in-between point, the processor 200 may determine that the bit count indicating the projection point is 0 based thereupon.

If there is no in-between point, the processor 200 may determine that the bit count indicating the projection point is 0.

If the first point (D0) and the second point (D1) are apart from each other by n times the minimum unit (where n is an integer and n>2), and there are one or more in-between points, the processor 200 may determine that the bit count indicating the projection point is n−1. Further, the processor 200 may indicate the presence or absence of an in-between point in the bit indicating the projection point, as 1 or 0. For example, if a plurality of bits are allocated, each bit may mean a point relatively farther away from the first point (D0) in order from the front.

Referring to FIG. 5B, in an example embodiment, since the second point (D1) whose projection position to the projection plane 300 is p[i] is positioned apart from the first point (D0) by four times the minimum unit, and there is one in-between point, the processor 200 may determine that the bit count indicating the projection point is 3 based thereupon. Further, the processor 200 may allocate 1, which means that a 3D point is present at the point where the distance from the first point (D0) is 1, to the first bit of the three allocated bits. Further, the processor 200 may allocate 0, which means that no 3D point is present at the point where the distance from the first point (D0) is 2, to the second bit of the three allocated bits. Further, the processor 200 may allocate 0, which means that no 3D point is present at the point where the distance from the first point (D0) is 3, to the third bit of the three allocated bits.

FIG. 6 is a table for describing an example of variably allocating the number of bits according to an example embodiment of the disclosure.

The processor 200 of FIG. 2 may include a plurality of points constituting a point cloud, which is three-dimensional data input to the transforming module 100 of FIG. 2 and designate the first point (D0), which is closest to the projection plane 300 among the plurality of points, and the second point (D1), which is farthest from the projection plane within a threshold distance (surface thickness) from the first point (D0) among the plurality of points placed on the same normal line as the first point (D0).

The processor 200 may identify the depth value present between the first point (D0) and the second point (D1). For example, the depth value corresponds to a distance present between the first point (D0) and the second point (D1).

If the second point is the same as the first point (D0=D1), the processor 200 may determine that no depth value is present between the first point (D0) and the second point (D1) and determine that the number of bits necessary for recording a depth value is 0. For example, if the second point is the same as the first point (D0=D1), D1 is 0.

If the first point (D0) and the second point (D1) are apart from each other by the minimum unit, the processor 200 may determine that no depth value is present between the first point (D0) and the second point (D1) and determine that the number of bits necessary for recording a depth value is 0. For example, if the first point (D0) is apart from the second point (D1) by the minimum unit, D1 is 1.

If the first point (D0) and the second point (D1) are apart from each other by n times the minimum unit (where n is an integer and n>1), the processor 200 may determine that the depth value present between the first point (D0) and the second point (D1) is a set including at least one of 0 to n−1 and determine that the number of bits necessary for recording the depth value is n−1. For example, if the first point (D0) and the second point (D1) are apart from each other by n times the minimum unit (where n is an integer and n>1), D1 is n. In an example embodiment, if the first point (D0) and the second point (D1) are apart from each other by four times the minimum unit, D1 is 4. If D1 is 4, the processor 200 may determine that the depth value present between the first point (D0) and the second point (D1) is a set including at least one of 0 (null) to 3 and determine that the number of bits necessary for recording the depth value is 3. In an example embodiment, if D1 is 4, the processor 200 may determine that depth values present between the first point D0 and the second point D1 are {0(null)}, {1}, {2}, {3}, {1, 2}, {1, 3} and {2, 3}, {1, 2, 3}.

In an example embodiment, the number of bits necessary for recording the depth value is smaller than the number of cases for depth values present between the first point (D0) and the second point (D1).

FIG. 7 is a table illustrating commands executable by a processor according to an example embodiment of the disclosure. In an example embodiment, FIG. 7 illustrates a command for determining the bit count indicating the second point D1 and the in-between point when the threshold distance (surface thickness) is 5.

The processor 200 of FIG. 2 may designate the field for storing the bit value indicating the second point (D1) as Most_significant_flag. In an example embodiment, if the second point (D1) and the first point (D0) are identical to each other or if the first point (D0) and the second point (D1) are apart from each other by the minimum unit, the processor 200 may encode Most_significant_flag into 0. In an example embodiment, if the first point (D0) and the second point D1 are apart from each other by two times to five times the minimum unit, the processor 200 may encode Most_significant_flag into 1.

If Most_significant_flag is 0, the processor 200 may determine that the number of bits for storing the second point (D1) is 1. For example, if the second point (D1) and the first point (D0) are identical to each other, the processor 200 may encode D1_value into 0 and, if the first point (D0) and the second point (D1) are apart from each other by the minimum unit, the processor 200 may encode D1_value into 1.

To reduce the bit value indicating the second point (D1) in the case where the first point (D0) and the second point (D1) are apart from each other by two to five times the minimum unit, the processor 200 may define D1_index which is a field one-to-one corresponding to D1_value. In an example embodiment, D1_index may have a value which is D1_value less 2. For example, if D1_value is 2, D1_index may be 0, if D1_value is 3, D1_index may be 1, if D1_value is 4, D1_index may be 2, and if D1_value is 5, D1_index may be 3. In an example embodiment, the processor 200 may store the binary number of D1_index in the bit indicating the second point (D1).

Unless Most_significant_flag is 0, the processor 200 may determine that the number of bits for indicating the second point (D1) is 2. In an example embodiment, if the first point (D0) and the second point (D1) are apart from each other by two times the minimum unit, D1_value may be encoded into 2, and D1_index may be encoded into 0. Since the binary number of D1_index is stored in the bit indicating the second point (D1), the processor 200 may store $00_{(2)}$, which is the binary number of 0, in the two bits determined.

In an example embodiment, if the first point (D0) and the second point (D1) are apart from each other by three times the minimum unit, the processor 200 may encode D1_value into 3, and D1_index into 1. Since the binary number of D1_index is stored in the bit indicating the second point (D1), the processor 200 may store $01_{(2)}$, which is the binary number of 1, in the two bits determined.

In an example embodiment, if the first point (D0) and the second point (D1) are apart from each other by four times the minimum unit, the processor 200 may encode D1_value into 4, and D1_index into 2. Since the binary number of D1_index is stored in the bit indicating the second point (D1), the processor 200 may store $10_{(2)}$, which is the binary number of 2, in the two bits determined.

In an example embodiment, if the first point (D0) and the second point (D1) are apart from each other by four times the minimum unit, the processor 200 may encode D1_value into 5, and D1_index into 3. Since the binary number of D1_index is stored in the bit indicating the second point (D1), the processor 200 may store $11_{(2)}$, which is the binary number of 3, in the two bits determined.

The processor 200 may designate the field for storing the presence or absence of an in-between point as In_between_flag. Further, the processor 200 may designate the field for storing the bit count indicating the in-between point as In_between_id. In an example embodiment, the processor 200 may allocate one bit to In_between_flag and, if no in-between point is present, encode In_between_flag into 0 and, if there is an in-between point, encode In_between_flag into 1.

If In_between_flag is 0, the processor 200 may determine that there is no in-between point and may refrain from coding for determining the bit count indicating the in-between point to be stored in In_between_id.

If D1_index is 0, D1_value is 2. In this case, thus, the first point (D0) and the second point (D1) are apart from each other by two times the minimum unit. Since In_between_flag is not 0, this corresponds to a case where an in-between point is present between the first point (D0) and the second point (D1). At this time, since there may be only one in-between point if the first point (D0) and the second point (D1) are apart from each other by two times the minimum unit, there may be only one case where In_between_flag is not 0 and D1_index is 0. If In_between_flag is not 0 and D1_index is 0, no additional information is needed for indicating the position of the in-between point relative to the first point (D0). Thus, in an example embodiment, the processor 200 may encode the bit count indicating the in-between point stored in In_between_id into 0 in the case where In_between_flag is not 0 and D1_index is 0.

If D1_index is 1, D1_value is 3. In this case, thus, the first point (D0) and the second point (D1) are apart from each other by two times the minimum unit. Since In_between_flag is not 0, this corresponds to a case where an in-between point is present between the first point (D0) and the second point (D1). In an example embodiment, if In_between_flag is not 0 and D1_index is 1, the processor 200 may encode the bit count indicating the in-between point stored in In_between_id into 2.

If D1_index is 2, D1_value is 4. In this case, thus, the first point (D0) and the second point (D1) are apart from each other by four times the minimum unit. Since In_between_flag is not 0, this corresponds to a case where an in-between point is present between the first point (D0) and the second point (D1). In an example embodiment, if In_between_flag is not 0 and D1_index is 2, the processor 200 may encode the bit count indicating the in-between point stored in In_between_id into 3.

If D1_index is 3, D1_value is 5. In this case, thus, the first point D0 and the second point D1 are apart from each other by five times the minimum unit. Since In_between_flag is not 0, this corresponds to a case where an in-between point is present between the first point (D0) and the second point (D1). In an example embodiment, if In_between_flag is not 0 and D1_index is 3, the processor 200 may encode the bit count indicating the in-between point stored in In_between_id into 4.

FIG. 8 is a table illustrating distribution probabilities of three-dimensional data constituting a point cloud according to an example embodiment of the disclosure.

The processor 200 of FIG. 2 may include a plurality of points constituting a point cloud, which is three-dimensional data input to the transforming module 100 of FIG. 2 and designate the first point (D0), which is closest to the projection plane 300 among the plurality of points, and the second point (D1), which is farthest from the projection plane within a threshold distance (surface thickness) from the first point (D0) among the plurality of points placed on the same normal line as the first point (D0).

The processor 200 may identify the depth value present between the first point (D0) and the second point (D1). Referring to FIG. 8, at least one point, except for the second point (D1) which is the maximum value of the D1 distribution, may correspond to an in-between point.

FIG. 8 shows a relative probability of occurrence of a corresponding state according to a distribution state of at least one in-between point in the case where there are the first point (D0), the second point (D1), and an in-between point.

FIG. 9 is a table illustrating the number of bits necessary in the example of variably allocating the number of bits according to an example embodiment of the disclosure.

In an example embodiment, if the threshold distance (surface thickness) is 4, the second point (D1) may have a value ranging from 0 to 4 depending on the distance between the first point (D0) and the second point (D1). For example, since the bit indicating the second point (D1) is the binary number of the value indicating the second point (D1), the maximum number of bits necessary for indicating the second point D1 is three bits necessary for storing $100_{(2)}$ which is the binary number of 4. In an example embodiment, the processor 200 of FIG. 2 may determine that the bit count indicating the second point (D1) is 3.

Referring to FIG. 6, in the case where the second point (D1) is 0 or 1, as an example, the number of bits necessary for storing the depth value present between the first point (D0) and the second point (D1) is 0. Further, referring to FIG. 6, in the case where the second point D1 is 2, as an example, the number of bits necessary for storing the depth value present between the first point (D0) and the second point (D1) is 1. Further, referring to FIG. 6, in the case where the second point D1 is 3, as an example, the number of bits necessary for storing the depth value present between the first point (D0) and the second point (D1) is 2. Further, referring to FIG. 6, in the case where the second point (D1) is 4, as an example, the number of bits necessary for storing the depth value present between the first point (D0) and the second point (D1) is 3.

Referring to FIG. 8, in the case where the second point (D1) is 0, as an example, the relative probability of occurrence of the state is 0.58900. Further, referring to FIG. 8, in the case where the second point (D1) is 1, as an example, the relative probability of occurrence of the state is 0.37900. Further, referring to FIG. 8, in the case where the second point (D1) is 2, as an example, the relative probability of occurrence of the state is 0.02200. Further, referring to FIG. 8, in the case where the second point (D1) is 3, as an example, the relative probability of occurrence of the state is 0.00500. Further, referring to FIG. 8, in the case where the second point (D1) is 4, as an example, the relative probability of occurrence of the state is 0.00500.

Referring to FIG. 9, given the relative probability of occurrence of the state and the total number of bits necessary to indicate depth information, the number of bits needed, e.g., in the case where the second point (D1) is 0, is 1.767. Further, referring to FIG. 9, given the relative probability of occurrence of the state and the total number of bits necessary to indicate depth information, the number of bits needed, e.g., in the case where the second point (D1) is 1, is 1.137. Further, referring to FIG. 9, given the relative probability of occurrence of the state and the total number of bits necessary to indicate depth information, the number of bits needed, e.g., in the case where the second point (D1) is 2, is 0.088. Further, referring to FIG. 9, given the relative probability of occurrence of the state and the total number of bits necessary to indicate depth information, the number of bits needed, e.g., in the case where the second point (D1) is 3, is 0.025. Further, referring to FIG. 9, given the relative probability of occurrence of the state and the total number of bits necessary to indicate depth information, the number of bits needed, e.g., in the case where the second point (D1) is 4, is 0.03.

FIG. 10 is a table illustrating the number of bits necessary in the example of variably allocating the number of bits according to an example embodiment of the disclosure.

Referring to FIGS. 7 and 10, D0_0 of FIG. 10 corresponds to the case where the second point (D1) is 0. D1_0 of FIG. 10 corresponds to the case where the second point (D1) is 1. D2_0 of FIG. 10 corresponds to the case where the second point (D1) is 2 and there is no in-between point. D3_0 of FIG. 10 corresponds to the case where the second point (D1) is 2 and there is an in-between point. D4_0 of FIG. 10 corresponds to the case where the second point (D1) is 3 and there is no in-between point. D2_1 of FIG. 10 corresponds to the case where the second point (D1) is 3 and there is one in-between point. D3_1 of FIG. 10 corresponds to the case where the second point (D1) is 3 and there are two in-between points. D3_2 of FIG. 10 corresponds to the case where the second point (D1) is 3 and there are three in-between points. D3_3 of FIG. 10 corresponds to the case where the second point (D1) is 4 and there is no in-between point. D4_1, D4_2, and D4_3 of FIG. 10 correspond to the case where the second point (D1) is 4 and there is one in-between point. D4_4, D4_5, and D4_6 of FIG. 10 correspond to the case where the second point (D1) is 4 and there are two in-between points. D4_7 of FIG. 10 corresponds to the case where the second point (D1) is 4 and there are three in-between points.

Given the relative probability of occurrence of the state according to the value of the second point (D1) and the number of in-between points of FIG. 8, the number of bits needed to represent the state of FIG. 10 may be calculated probabilistically.

Referring to FIG. 10, given the relative probability of occurrence of the state and the total number of bits needed to represent depth information, the total bit value is 1.49 in the case of variably determining the number of bits to represent the depth value considering at least one of the distance between the first point (D0) and the second point (D1) and the number of in-between points.

The bit code of FIG. 10 may correspond to a Huffman code.

According to the present invention, it is possible to transform three-dimensional data into two-dimensional data using a smaller number of bits than that when the number of bits to represent the depth value is fixedly determined.

Figure 11:
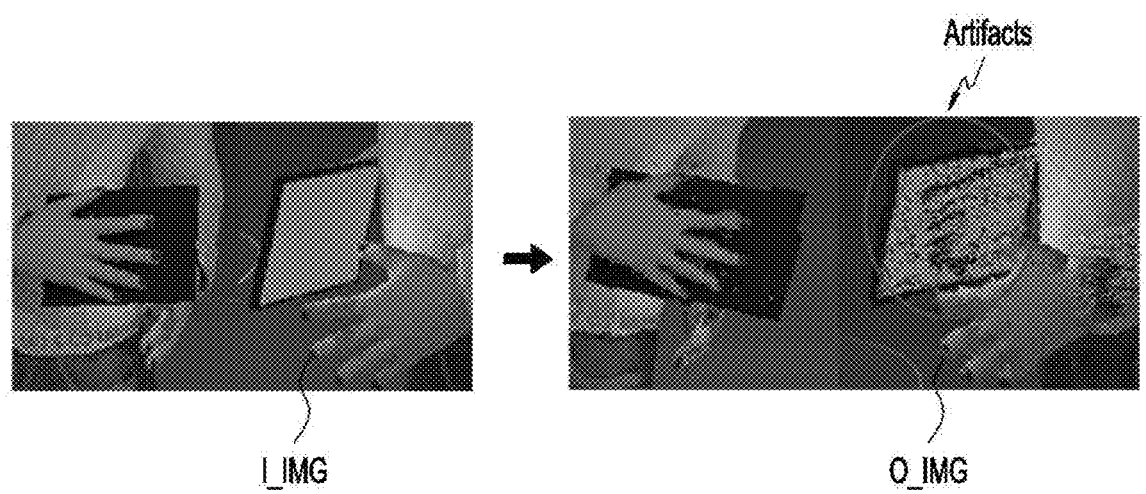
FIG. 11 illustrates an example in which an error occurs upon reconstructing three-dimensional data according to an example embodiment of the disclosure.

FIG. 11 illustrates an example in which an error occurs upon reconstructing three-dimensional data according to an example embodiment of the disclosure.

The receiver 20 of FIG. 1 may receive compressed two-dimensional data, decompress, and transform into three-dimensional data. Referring to FIG. 11, artifacts where different surfaces are mixed on the same surface may occur while the receiver 20 reconstructs the received data I_IMG. For example, the surface of a tablet PC and the surface of the hand are positioned at different points for the received data I_IMG but, for the reconstructed data O_IMG, they may be mixed on the surface of the tablet PC, i.e., artifacts occur.

In an example embodiment, if the thickness of a 3D object included in the three-dimensional data when the transforming module 100 of FIG. 1 transforms the three-dimensional data into two-dimensional data is thin enough to be larger than a threshold, artifacts, where different surfaces are mixed on the same surface, may be caused in the case where the transforming module 100 reconstructs the compressed data in the receiver 20.

If the point corresponding to the surface of the tablet PC is D0 point, and the point corresponding to the surface of the hand is D1 point in the 2D image of FIG. 11, it may be determined whether the patches are identical, considering the distance to the projection plane in the projection direction and the similarity in normal vector between each D0 point and D1 point with depth information.

In an example embodiment, the transforming module 100 of FIG. 1 may receive one or more point cloud groups (point cloud frame) included in Dataset_1 and transform the point cloud groups, thereby outputting Dataset_2 including a D0 image including the D0 point and a D1 image including the D1 point. For example, the depth information of the D1 image may be represented as difference from the depth information of the D0 image. In an example embodiment, Dataset_2 may include a T0 image including color information corresponding to the D0 point and a T1 image including color information corresponding to the D1 point. For example, the D0 image may correspond to the T0 image, and the D1 image may correspond to the T1 image.

In an example embodiment, the artifacts of FIG. 11 may be the error that the D0 point and the D1 point are determined to be present in the same patch although they should be determined to be present in different patches.

In an example embodiment, Dataset_2 may include auxiliary data and an occupancy map to distinguish between pixels including data information included in Dataset_1 and pixels including no data information included in Dataset_1 among the pixels of the 2D image.

FIG. 12 is a table illustrating commands executable by a processor and descriptions thereof, according to an example embodiment of the disclosure.

The processor 200 of FIG. 2 may extract color information T0 corresponding to a first point included in a region of interest. The processor 200 may extract position information D0 of the first point. In an example embodiment, the region of interest may correspond to a point cloud group which is three-dimensional data.

The processor 200 may extract color information T1 corresponding to a second point positioned within a threshold distance from the first point. In an example embodiment, the threshold distance may be determined considering the similarity in normal vector between the first point and the second point. Or, the threshold distance may be determined considering the similarity between the distance between the first point and the projection plane and the distance between the second point and the projection plane.

The processor 200 may compare a threshold with a difference between the color information T0 corresponding to the first point and the color information T1 corresponding to the second point. In an example embodiment, if the difference between the color information T0 corresponding to the first point and the color information T1 corresponding to the second point is smaller than the threshold, the processor 200 may determine that the second point is included in the region of interest including the first point. For example, that the second point is included in the region of interest including the first point may mean that the second point and the first point belong to the same point cloud group. For example, that the second point and the first point belong to the same point cloud group may mean that the second point and the first point are included in the same patch in the case where three-dimension data is projected to two-dimensional data.

In an example embodiment, if the difference between the color information T0 corresponding to the first point and the color information T1 corresponding to the second point is larger than the threshold, the processor 200 may determine that the second point is not included in the region of interest including the first point. For example, that the second point is not included in the region of interest including the first point may mean that the second point and the first point do not belong to the same point cloud group. For example, that the second point and the first point do not belong to the same point cloud group may mean that the second point and the first point are not included in the same patch in the case where three-dimensional data is projected to two-dimensional data.

In an example embodiment, the difference between the color information corresponding to the first point and the color information corresponding to the second point may be a difference between the average of pieces of color information corresponding to a plurality of points around the first point and the average of pieces of color information corresponding to a plurality of points around the second point.

The processor 200 may compare the color information T1 corresponding to a plurality of second points with the color information T0 corresponding to the first point, thereby determining whether the plurality of second points are included in the region of interest including the first point.

In an example embodiment, the color information may be obtained from the values of various color channels including, e.g., red-green-blue (RGB) color channels or YUV color channels. In an example embodiment, the difference in color information may be obtained by various methods, e.g., a method of taking the absolute value of the difference or a method of using the Euclidean geometric distance.

In an example embodiment, the threshold may correspond to the values of various color channels including, e.g., RGB color channels or YUV color channels. In an example embodiment, the threshold may correspond to the average of the RGB color channels of the plurality of points constituting the point cloud group. In an example embodiment, the threshold may correspond to the average of the YUV color channels of the plurality of points constituting the point cloud group. For example, the threshold may correspond to the average of the RGB color channel corresponding to the first point and the RGB color channel corresponding to the second point. For example, the threshold may correspond to the average of the YUV color channel corresponding to the first point and the YUV color channel corresponding to the second point.

The processor 200 may extract the distance between the first point and the second point. In an example embodiment, if the difference between the color information T0 corresponding to the first point and the color information T1 corresponding to the second point is larger than the threshold, the processor 200 may reduce the threshold distance by a threshold unit. In an example embodiment, the processor 200 may change the existing second point into a third point which is within the reduced threshold distance from the first point. The processor 200 may compare the color information corresponding to the third point with the color information corresponding to the first point, thereby determining whether the third point is included in the region of interest including the first point.

The processor 200 may execute the command of FIG. 12 to perform the above-described operations.

Figure 13:
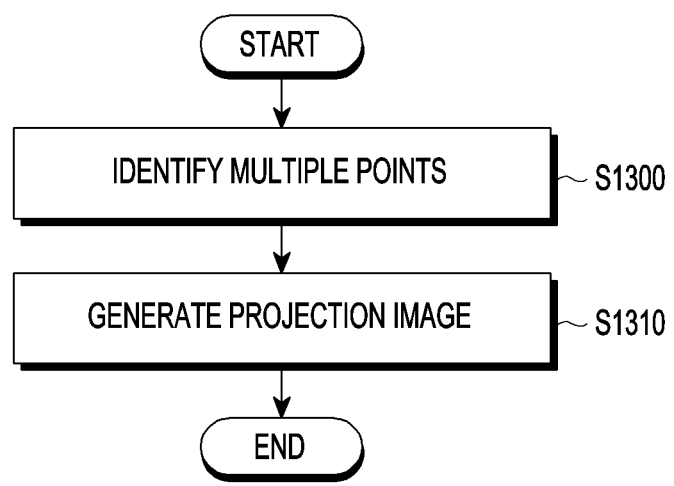
FIG. 13 is a flowchart illustrating operations of a device according to an example embodiment of the disclosure.

FIG. 13 is a flowchart illustrating operations of a device according to an example embodiment of the disclosure.

Referring to FIG. 13, the processor 200 may identify a plurality of points constituting a point cloud (S1300).

Next, the processor 200 may generate a projection image by projecting the plurality of identified points to a projection plane (S1310).

Figure 14:
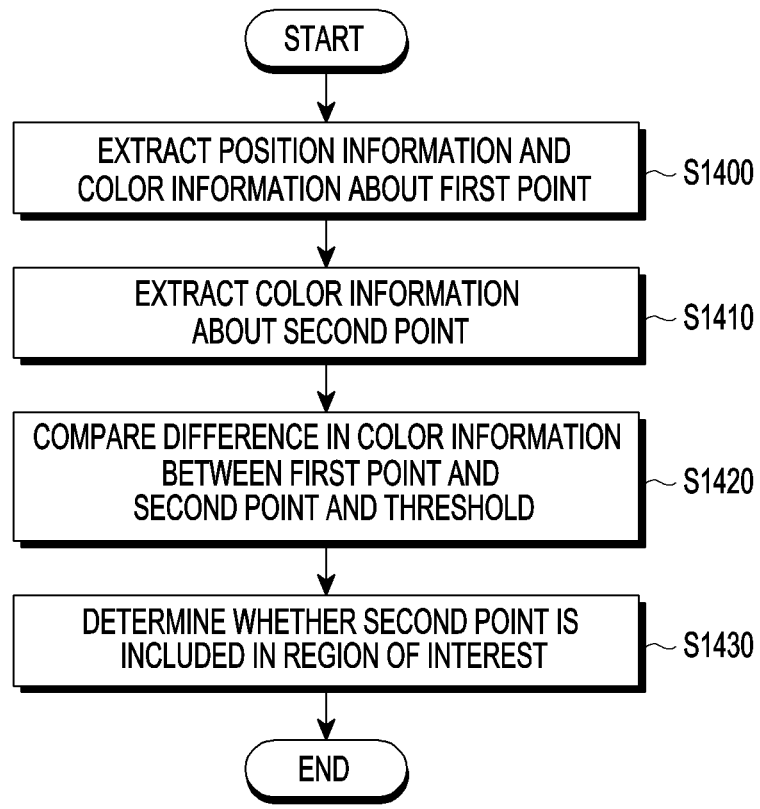
FIG. 14 is a flowchart illustrating operations of a device according to an example embodiment of the disclosure.

FIG. 14 is a flowchart illustrating operations of a device according to an example embodiment of the disclosure.

Referring to FIG. 14, the processor 200 may extract position information and color information of the first point included in the region of interest (S1400).

Then, the processor 200 may extract color information corresponding to a second point positioned within a threshold distance from the first point (S1410).

Next, the processor 200 may compare a threshold with a difference between the color information corresponding to the first point and the color information corresponding to the second point (S1420).

Then, if the difference between the color information corresponding to the first point and the color information corresponding to the second point is equal to or smaller than the threshold, the processor 200 may determine that the second point is included in the region of interest (S1430). Or, if the difference between the color information corresponding to the first point and the color information corresponding to the second point is larger than the threshold, the processor 200 may determine that the second point is not included in the region of interest (S1430).

According to the present invention, it is possible to remove or reduce the error that different surfaces are mixed on the same surface during the course of transforming three-dimensional data into two-dimensional data. Thus, errors occurring upon transforming or compressing three-dimensional data may be reduced.

Example embodiments have been described above in connection with the drawings. Although the embodiments have been described with reference to specific terms, this is intended simply for describing the technical idea of the disclosure and should not be interpreted as limiting the scope of the disclosure which is defined by the appended claims. It will be apparent to one of ordinary skill in the art that various changes may be made thereto without departing from the scope of the disclosure. Accordingly, the scope of the present invention should be determined by the technical idea of the invention as claimed in the claims.

The invention claimed is:

1. A method for compressing three-dimensional data for a point cloud, the method comprising:
    identifying a plurality of points constituting the point cloud;
    generating a projection image by projecting the plurality of points to a projection plane;
    identifying a first point and a second point on a normal line of the projection plane, wherein the first point is a point closest to the projection plane among the plurality of points projected to the projection plane, and the second point is a point farthest from the projection plane within a threshold distance from the first point among the plurality of points projected to the projection plane;
    determining at least one first bit for indicating a first position of the first point on the normal line of the projection plane, and at least one second bit for indicating a second position of the second point on the normal line of the projection plane;
    identifying a depth value corresponding to a distance between the first point and the second point based on the first position and the second position;
    identifying whether there is at least one third point between the first point and the second point based on the depth value;
    if there is not the at least one third point, encoding the at least one first bit and the at least one second bit;
    if there is the at least one third point:
        determining at least one third bit for indicating a third position of the at least one third point on the normal line of the projection plane, and
        encoding the at least one first bit, the at least one second bit and the at least one third bit;
    if there is the first point, without the second point and the at least one third point, on the normal line of the projection plane, identifying that the depth value is 0;
    determining a number of the at least one second bit to be 1 based on the identification that the depth value is 0;

determining a second bit as a value indicating that there is not the second point; and encoding the at least one first bit and the at least one second bit, wherein a number of the at least one third bit is variable based on the depth value.

2. The method of claim 1, wherein the number of the at least one second bit is determined based on the depth value.

3. The method of claim 2, wherein if the depth value corresponds to a unit on the normal line of the projection plane, the number of the at least one second bit is 1.

4. The method of claim 2, wherein if the depth value corresponds to n times a unit on the normal line of the projection plane, where n is an integer larger than 1, the number of the at least one second bit is a value to store a binary number of n.

5. The method of claim 1, wherein if the depth value is n times a unit on the normal line of the projection plane, where n is an integer larger than 1, the number of the at least one third point is n−1.

6. The method of claim 1, wherein if the depth value is 2 times a unit on the normal line of the projection plane, the number of the at least one third bit is 1, if the depth value is 3 times the unit, the number of the at least one third bit is 2, and if the depth value is 4 times the unit, the number of the at least one third bit is 3, and wherein the threshold distance is 5.

7. A device for compressing three-dimensional data for a point cloud, the device comprising:

a processor; and a memory configured to store instructions executable by the processor, wherein the processor is configured to:

identify a plurality of points constituting the point cloud, generate a projection image by projecting the plurality of points to a projection plane, identify a first point and a second point on a normal line of the projection plane, wherein the first point is a point closest to the projection plane among the plurality of points projected to the projection plane, and the second point is a point farthest from the projection plane within a threshold distance from the first point among the plurality of points projected to the projection plane, determine at least one first bit for indicating a first position of the first point on the normal line of the projection plane, and at least one second bit for indicating a second position of the second point on the normal line of the projection plane, identify a depth value corresponding to a distance between the first point and the second point based on the first position and the second position, identify whether there is at least one third point between the first point and the second point based on the depth value, if there is not the at least one third point, encode the at least one first bit and the at least one second bit, if there is the at least one third point:

determine at least one third bit for indicating a third position of the at least one third point on the normal line of the projection plane, and encode the at least one first bit, the at least one second bit and the at least one third bit, if there is the first point, without the second point and the at least one third point, on the normal line of the projection plane, identify that the depth value is 0, determine a number of the at least one second bit to be 1 based on the identification that the depth value is 0, determine a second bit as a value indicating that there is not the second point, and encode the at least one first bit and the at least one second bit, and wherein a number of the at least one third bit is variable based on the depth value.

8. The device of claim 7, wherein the number of the at least one second bit is determined based on the depth value.

9. The device of claim 7, wherein if the depth value corresponds to a unit on the normal line of the projection plane, the number of the at least one second bit is 1.

10. The device of claim 7, wherein if the depth value corresponds to n times a unit on the normal line of the projection plane, where n is an integer larger than 1, the number of the at least one second bit is a value to store a binary number of n.

11. The device of claim 7, wherein, if the depth value is n times a unit on the normal line of the projection plane, where n is an integer larger than 1, the number of the at least one third point is n−1.

12. The device of claim 7, wherein if the depth value is 2 times a unit on the normal line of the projection plane, the number of the at least one third bit is 1, if the depth value is 3 times the unit, the number of the at least one third bit is 2, and if the depth value is 4 times the unit, the number of the at least one third bit is 3, and wherein the threshold distance is 5.

* * * * *